(12) United States Patent
Taylor

(10) Patent No.: US 8,480,341 B2
(45) Date of Patent: Jul. 9, 2013

(54) NUT RETAINER CAGE

(75) Inventor: Mark K. Taylor, Hurst, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 1198 days.

(21) Appl. No.: 12/115,235

(22) Filed: May 5, 2008

(65) Prior Publication Data

US 2009/0226247 A1 Sep. 10, 2009

Related U.S. Application Data

(60) Provisional application No. 61/033,922, filed on Mar. 5, 2008.

(51) Int. Cl.
*F16B 39/10* (2006.01)
(52) U.S. Cl.
USPC .............................. 411/87; 411/102; 411/121
(58) Field of Classification Search
USPC ............. 411/87, 95, 102, 111, 119, 120, 121, 411/104, 539–541
See application file for complete search history.

(56) References Cited

U.S. PATENT DOCUMENTS

| 95,897 | A | * | 10/1869 | Griswold | 411/87 |
|---|---|---|---|---|---|
| 333,580 | A | * | 1/1886 | White | 411/119 |
| 346,452 | A | * | 8/1886 | Barker | 411/120 |
| 439,212 | A | * | 10/1890 | Tisdale | 411/87 |
| 459,645 | A | * | 9/1891 | Pearman | 411/120 |
| 516,563 | A | * | 3/1894 | Butler | 411/121 |
| 539,692 | A | * | 5/1895 | Lister | 411/121 |
| 581,215 | A | * | 4/1897 | Lombas | 411/87 |
| 657,365 | A | * | 9/1900 | Simons | 411/95 |
| 987,705 | A | * | 3/1911 | Dietrich | 411/235 |
| 1,379,607 | A | * | 5/1921 | Ashley | 411/87 |
| 2,875,805 | A | * | 3/1959 | Flora | 411/111 |
| 4,657,457 | A | * | 4/1987 | Rickwood | 411/93 |
| 4,887,949 | A | * | 12/1989 | Dimmick et al. | 411/121 |
| 5,032,047 | A | | 7/1991 | Theakston | |
| 7,147,418 | B2 | | 12/2006 | Clinch et al. | |
| 7,189,043 | B2 | | 3/2007 | Benoit et al. | |
| 7,258,519 | B2 | * | 8/2007 | Shimizu | 411/433 |

* cited by examiner

*Primary Examiner* — Flemming Saether
(74) *Attorney, Agent, or Firm* — Bracewell & Giuliani LLP

(57) ABSTRACT

A nut retainer for a fastener. The nut retainer may include one or more vertical support members that can mate with and receive vertical surfaces of the fastener. The nut retainer may also include one or more horizontal retaining members that can be coupled to at least one end of one or more of the vertical support members adapted to mate with and receive horizontal surfaces of the fastener.

14 Claims, 16 Drawing Sheets

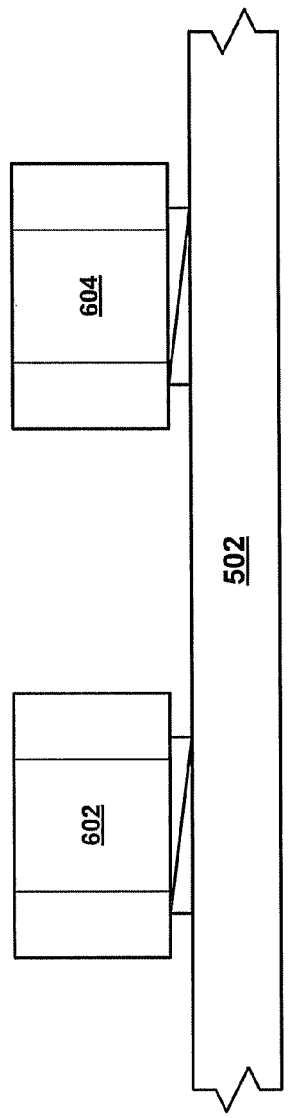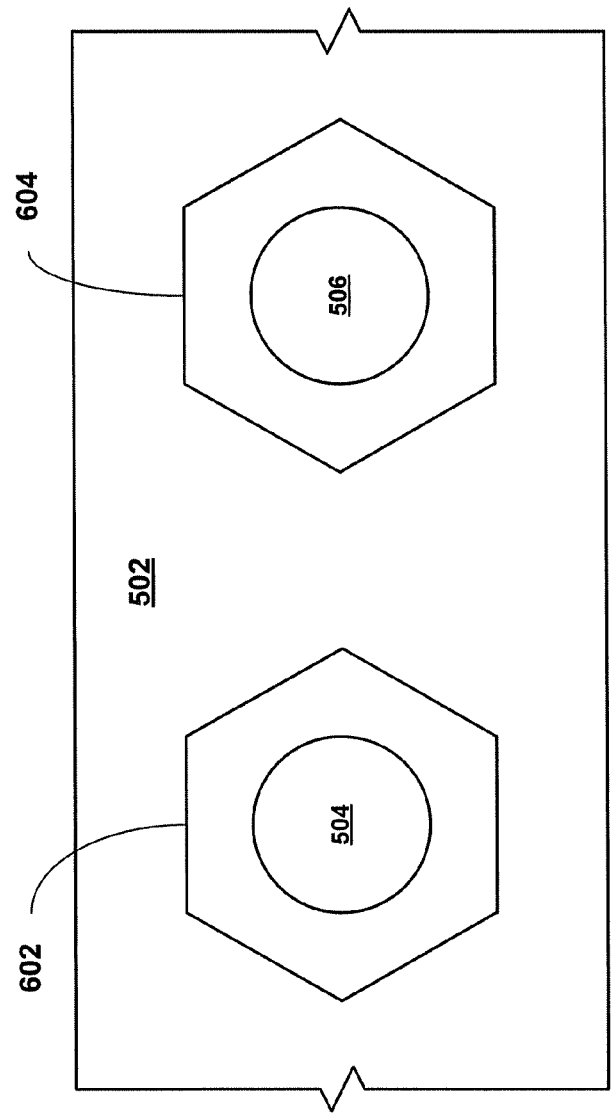
Fig. 6a
Fig. 6b

NUT RETAINER CAGE

CROSS-REFERENCE TO RELATED APPLICATIONS

The present application claims priority to U.S. provisional patent application Ser. No. 61/033,922, filed on Mar. 5, 2008, the disclosure of which is incorporated herein by reference.

BACKGROUND

This disclosure relates to retainers for mechanical fasteners.

BRIEF DESCRIPTION OF THE DRAWINGS

FIG. 5b is a top view of the screws of FIG. 5a.

FIG. 6a is a front view of screws of FIG. 5a with nuts threadably coupled to each of the screws.

FIG. 6b is a top view of the screws and nuts of FIG. 6a.

DETAILED DESCRIPTION

Figure 1:
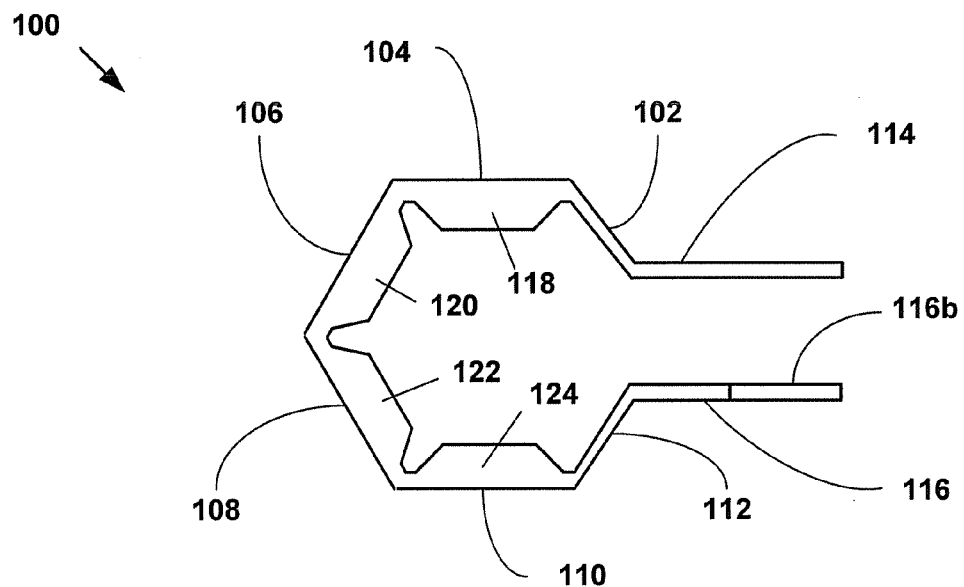
FIG. 1 is a top view of an exemplary embodiment of a nut retainer.
Figure 2:
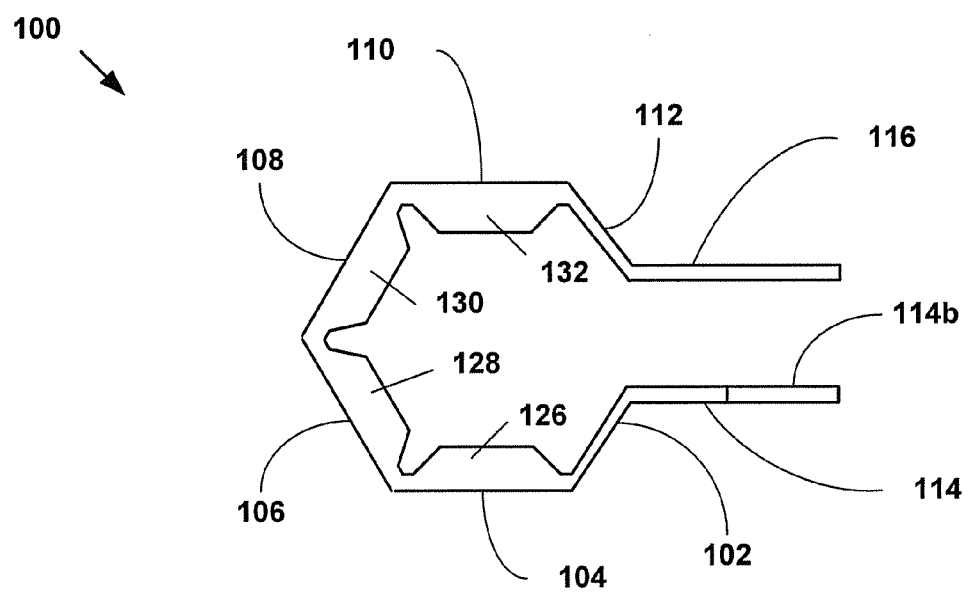
FIG. 2 is a bottom view of the nut retainer of FIG. 1.

In the drawings and description that follows, like parts are marked throughout the specification and drawings with the same reference numerals, respectively. The drawings are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce desired results. The various characteristics mentioned above, as well as other features and characteristics described in more detail below, will be readily apparent to those skilled in the art upon reading the following detailed description of the embodiments, and by referring to the accompanying drawings.

Referring initially to FIGS. 1, 2, 3, 3a, 4, and 4a, an exemplary embodiment of a nut retainer 100 is a strip of metal bent into a configuration that includes six vertical side walls or members, 102, 104, 106, 108, 110, and 112, that together define a cavity or polygonal receptacle having an outer profile that approximates a hexagon. In an exemplary embodiment, each adjacent pair of vertical side members define an angle therebetween of approximately 120 degrees. In an exemplary embodiment, the vertical heights of the vertical side members, 102, 104, 106, 108, 110, and 112, are substantially equal. In an exemplary embodiment, the horizontal lengths of the vertical side members, 102 and 112 are substantially equal, and the horizontal lengths of the Vertical side members, 104, 106, 108, and 110, are substantially equal. In an exemplary embodiment, the horizontal lengths of the vertical side members, 102 and 112, are less than the horizontal lengths of the vertical side members, 104, 106, 108, and 110.

Retainer 100 has a central axis and side members 102, 104, 106, 108, 110 and 112 extend circumferentially around the axis. The polygonal receptacle defined by retainer 100 has a gap. A vertical side member or gate wall 114 extends from an end of the vertical side member 102 that defines a passage 114a and includes a rectangular tab 114b at one end. For convenience, vertical side member 114 may be considered to be a right hand gate wall. In an exemplary embodiment the vertical height of the vertical side member 114 is substantially equal to the vertical height of the vertical side member 102. In an exemplary embodiment, the vertical side members, 102 and 114, define an angle therebetween of approximately 120 degrees.

A vertical side member or gate wall 116 extends from an end of the vertical side member 112 that defines a passage 116a and includes a rectangular tab 116b at one end. For convenience, vertical side member 116 may be considered to be a right hand gate wall. In an exemplary embodiment the vertical height of the vertical side member 116 is substantially equal to the vertical height of the vertical side member 112. In an exemplary embodiment, the vertical side members, 112 and 116, define an angle therebetween of approximately 120 degrees.

Figure 3:
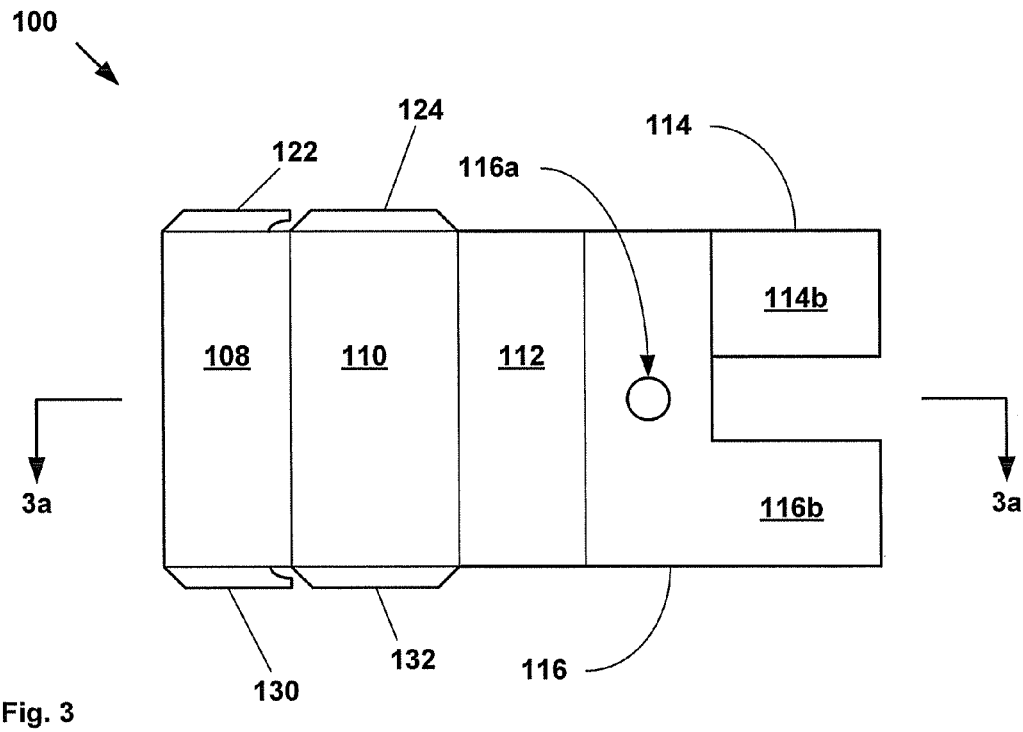
FIG. 3 is a side view of the nut retainer of FIG. 1.
Figure 3A:
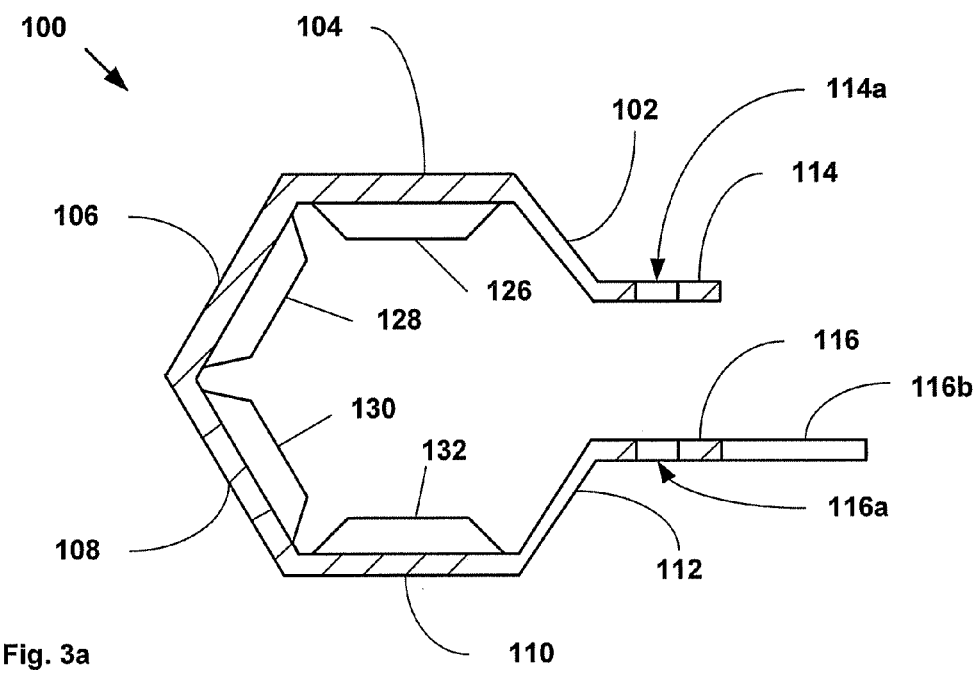
FIG. 3a is a cross-sectional view of the nut retainer of FIG. 3.
Figure 4:
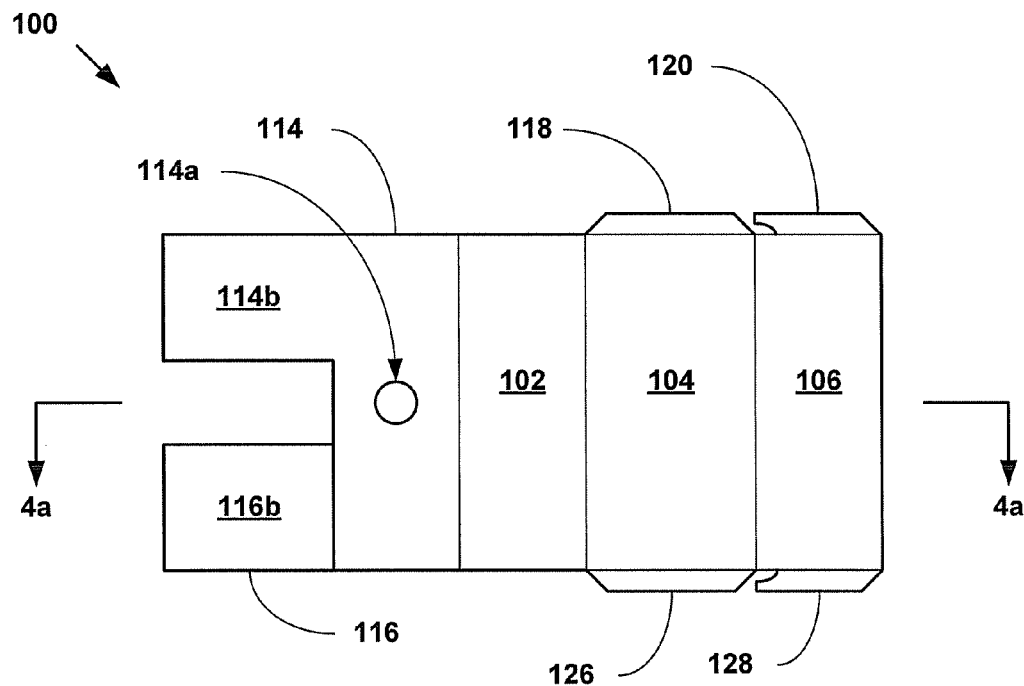
FIG. 4 is another side view of the nut retainer of FIG. 1.
Figure 4A:
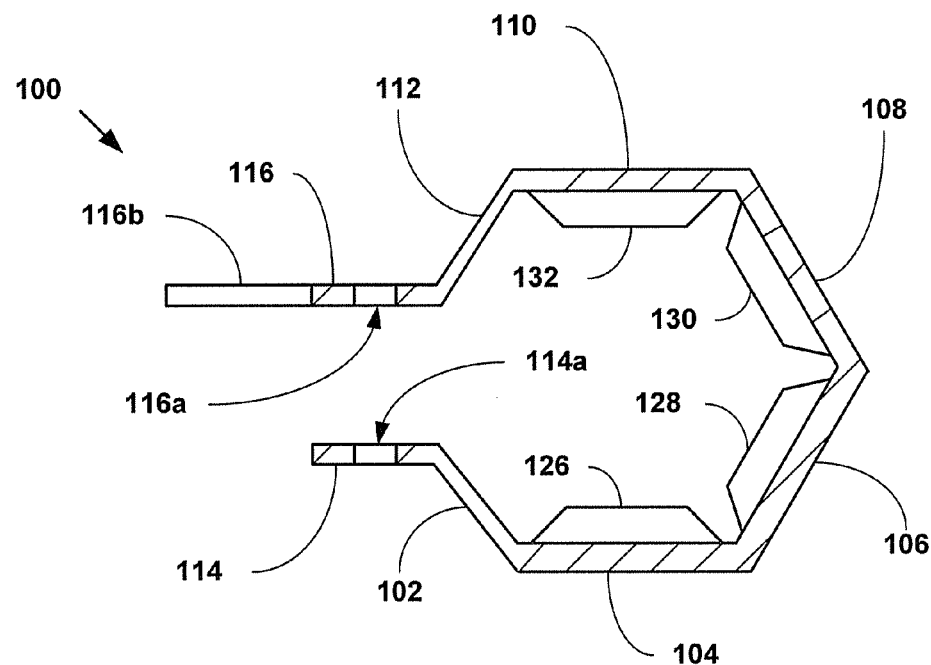
FIG. 4a is a cross-sectional view of the nut retainer of FIG. 4.

In an exemplary embodiment, the vertical side members, 114 and 116, are spaced apart the width of the gap, positioned opposite to one another, and are substantially parallel to one another. In an exemplary embodiment, the passages, 114a and 116a, of the vertical side members, 114 and 116, are positioned opposite to one another. In an exemplary embodiment, the tabs, 114b and 116b, of the vertical side members, 114 and 116, are not positioned opposite one another while in the open position. shown in FIGS. 3a, 4a, 7 and 8, and are vertically offset from one another. As shown in FIG. 3a. tab 114b has an upper edge flush with the upper edges of side members 108, 110 and 112. Tab 116b has a lower edge flush with the lower edges of side members 108, 110, and 112. The lower edge of tab 114a is above the upper edge of tab 116b when tabs 114a and 116a are bent to the closed position shown in FIG. 8.

Horizontal retaining members or upper flanges, 118, 120, 122, and 124, extend from upper ends of the vertical side members, 104, 106, 108 and 110, respectively, in a direction that positions the retaining members above the hexagonal cavity defines by the vertical side members. In an exemplary embodiment, the retaining members, 118, 120, 122, and 124, have trapezoidal profiles. Horizontal retaining members 118, 120, 122, 124 extend partially toward the axis of retainer 100.

Horizontal retaining members or lower flanges, 126, 128, 130, and 132, extend from lower ends of the vertical side members, 104, 106, 108 and 110, respectively, in a direction that positions the retaining members above the hexagonal cavity defines by the vertical side members. In an exemplary embodiment, the retaining members, 126, 128, 130, and 132, have trapezoidal profiles. In an exemplary embodiment, the retaining members, 118, 120, 122, and 124, are vertically spaced apart and positioned in opposing relation to the retaining members, 126, 128, 130 and 132, respectively. Horizontal retaining members 126, 128, 130, and 132 extend partially toward the axis of retainer 100.

In an exemplary embodiment, the nut retainer 100 is fabricated from a metallic material such as, for example, low carbon steel, that will permit the nut retainer to be elastically deformed to permit the nut retainer to be placed onto a conventional hexagonal nut without plastically deforming the retainer.

Figure 5A:
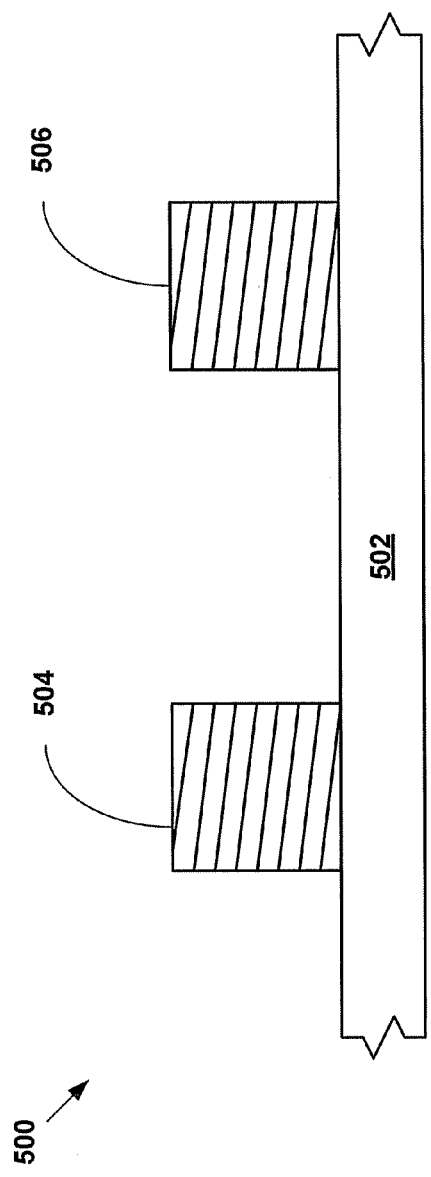
FIG. 5a is a front view of a pair of spaced apart screws.
Figure 5B:
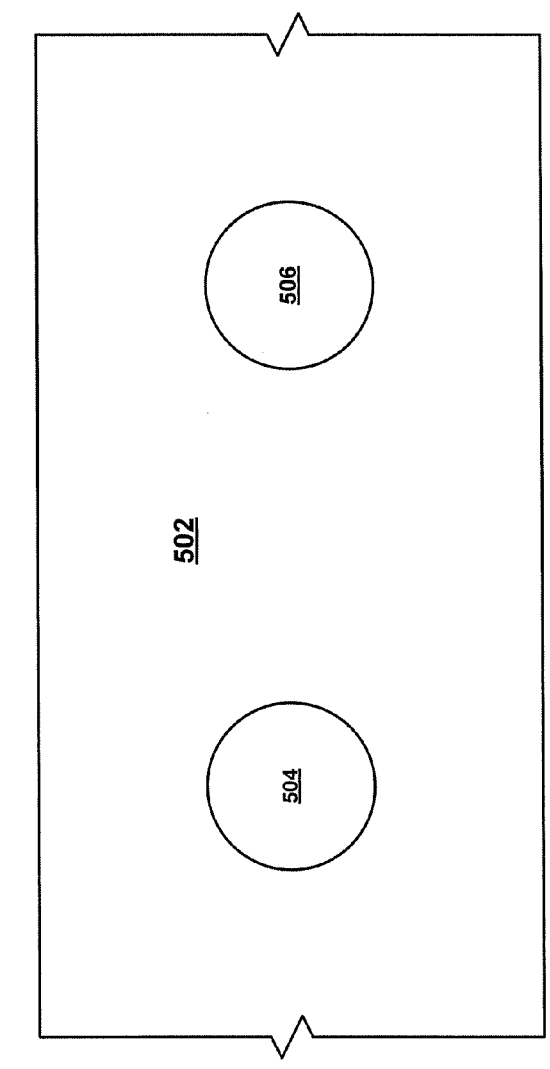

Referring now to FIGS. 5*a* and 5*b*, an assembly 500 includes a base member 502 and a pair of spaced apart threaded posts, 504 and 506, that are coupled to and extend from the base member.

Referring now to FIGS. 6*a* and 6*b*, conventional hexagonal nuts, 602 and 604, are then threaded onto the posts, 504 and 506, respectively.

Figure 7:
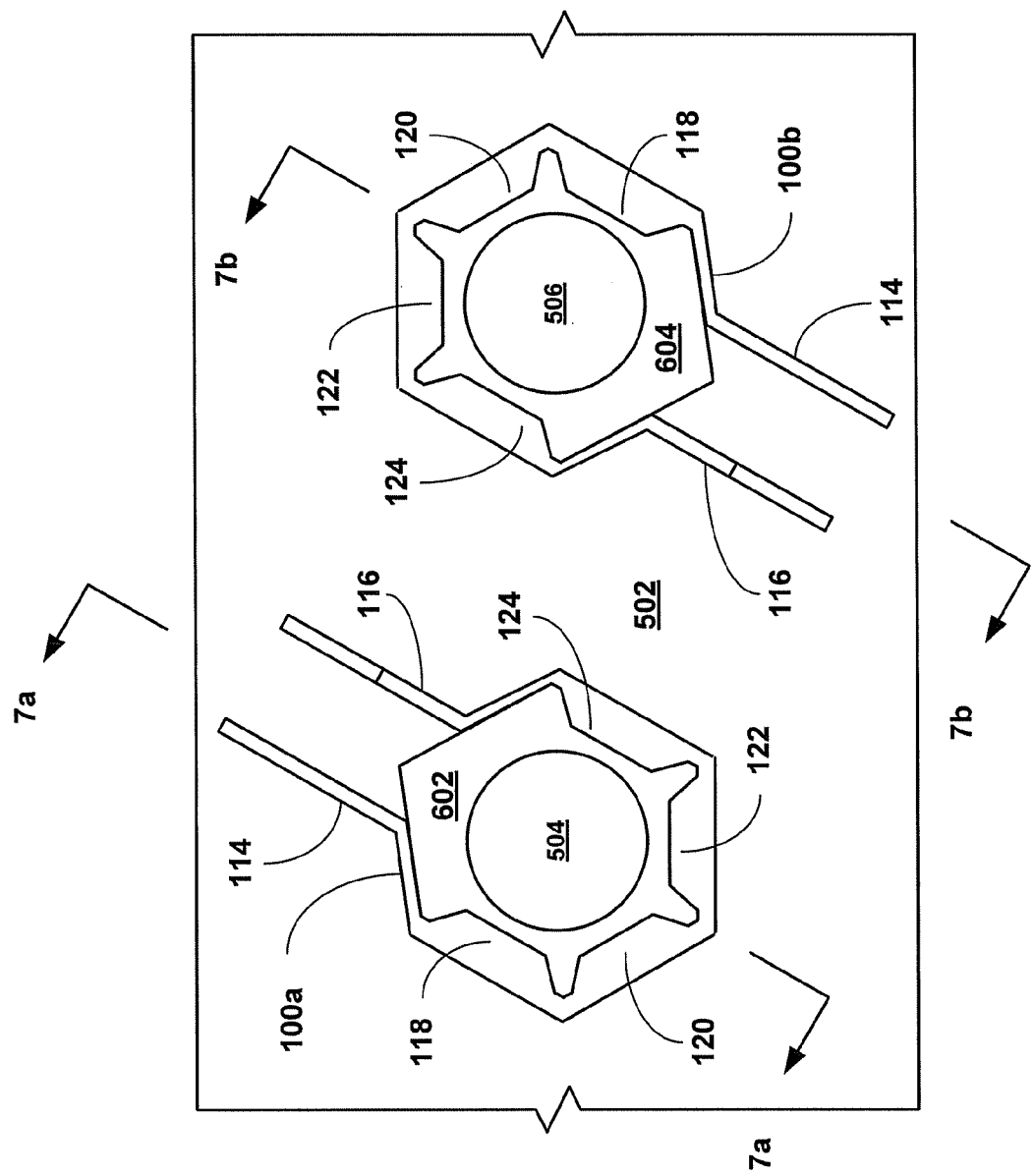
FIG. 7 is a top view of the mounting of nut retainers onto each of the nuts of FIGS. 6a and 6b.
Figure 7A:
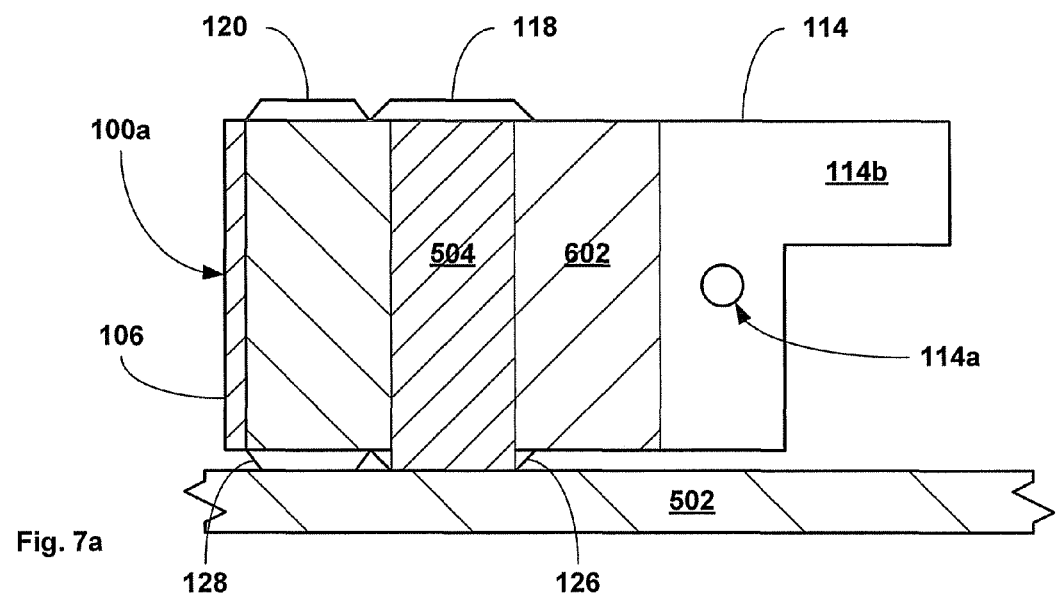
FIGS. 7a and 7b are cross sectional illustrations of the nut retainers mounted onto the nuts on FIG. 7.
Figure 7B:
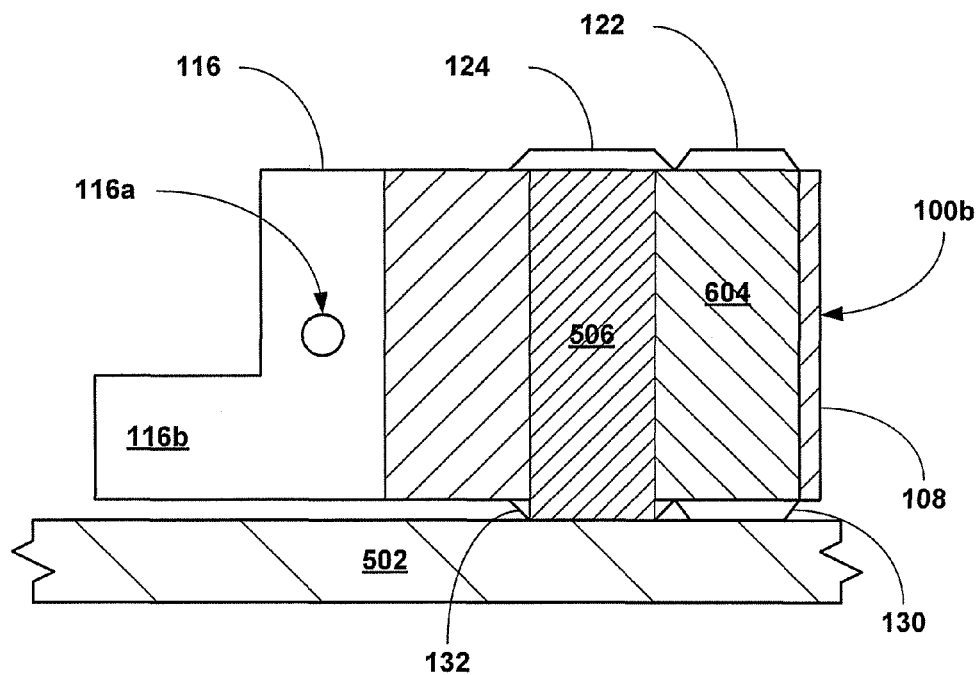
Figure 8:
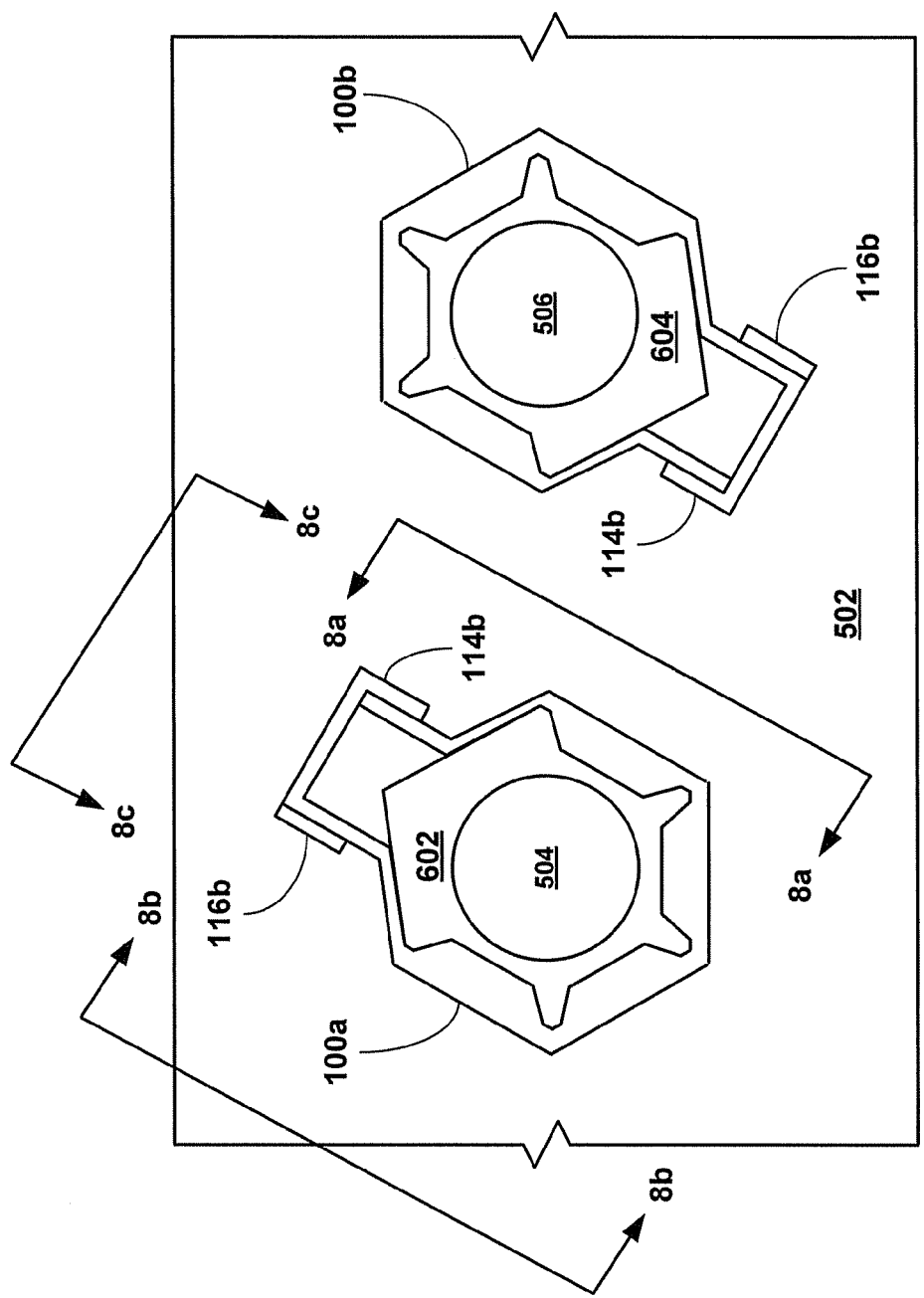
FIG. 8 is a top view of the bending of the retaining tabs on the nut retainers of FIGS. 7, 7a, and 7b.
Figure 8A:
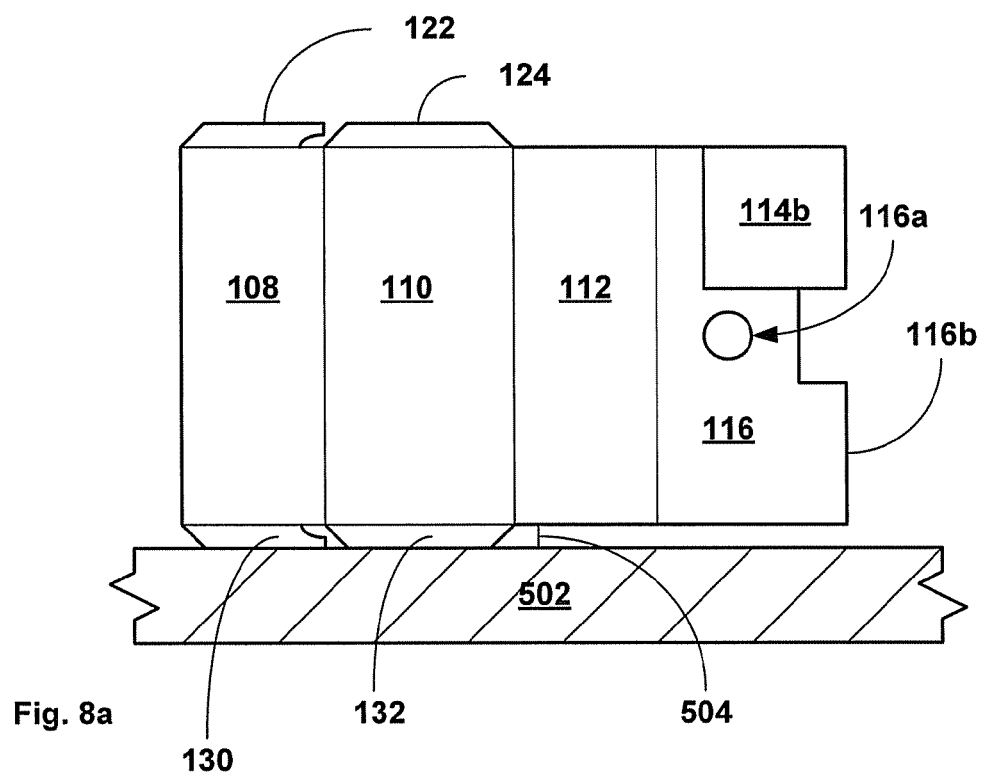
FIGS. 8a, 8b, and 8c are various side views of one of the nut retainers of FIG. 8.
Figure 8B:
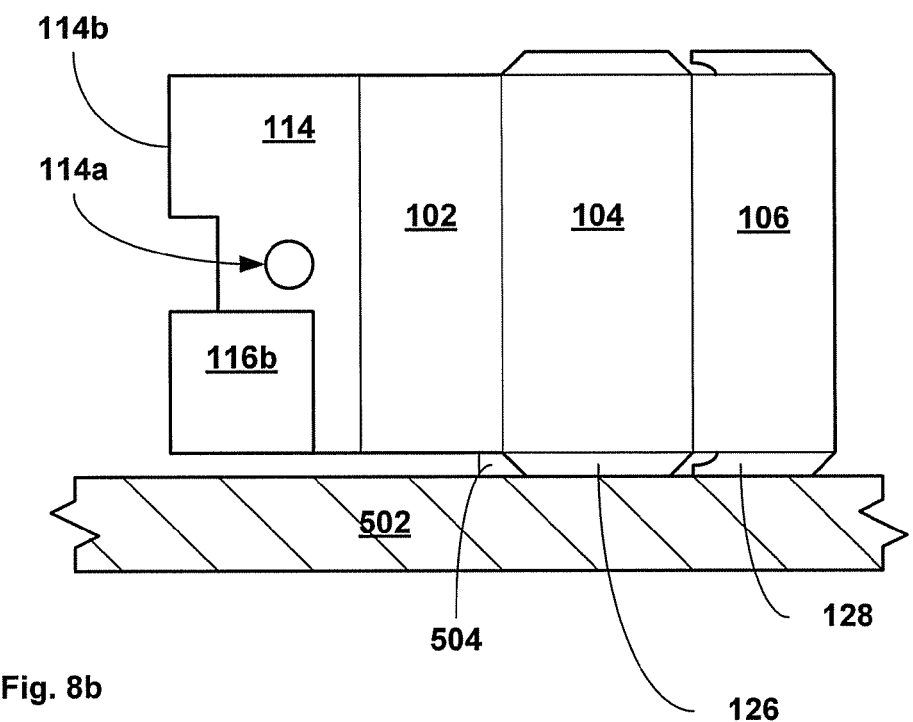
Figure 8C:
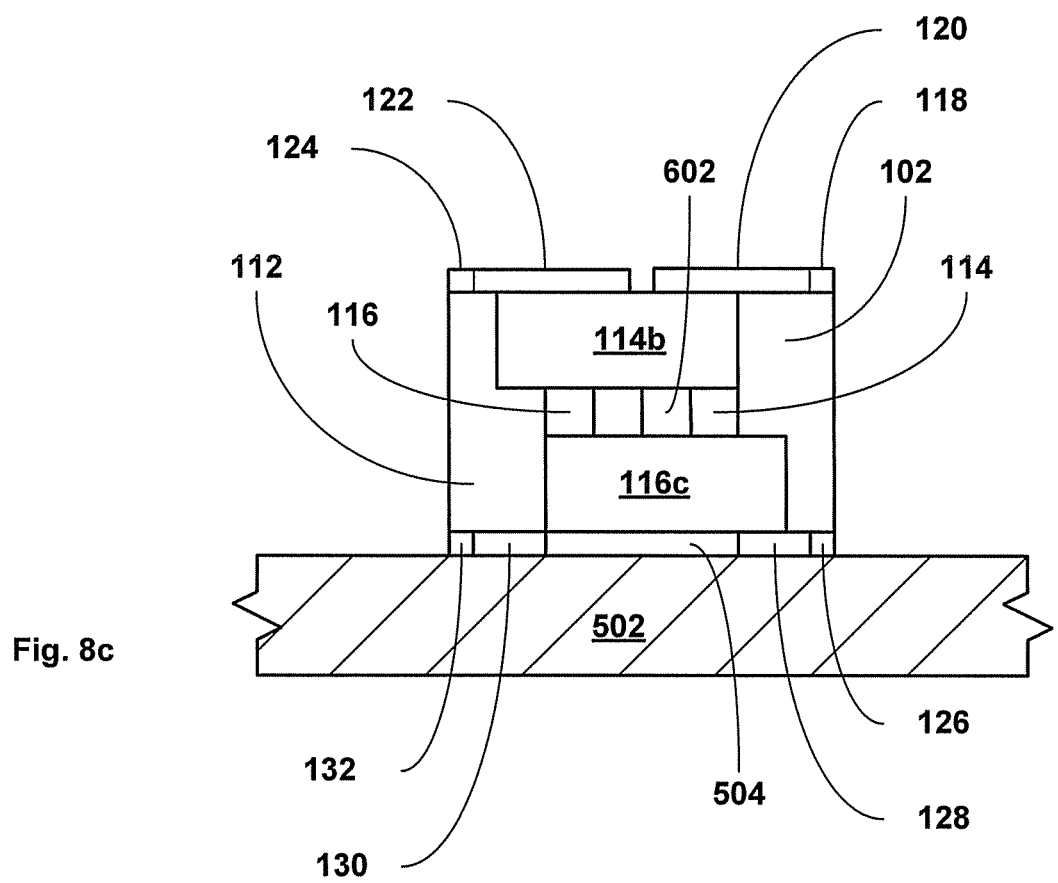
Figure 9:
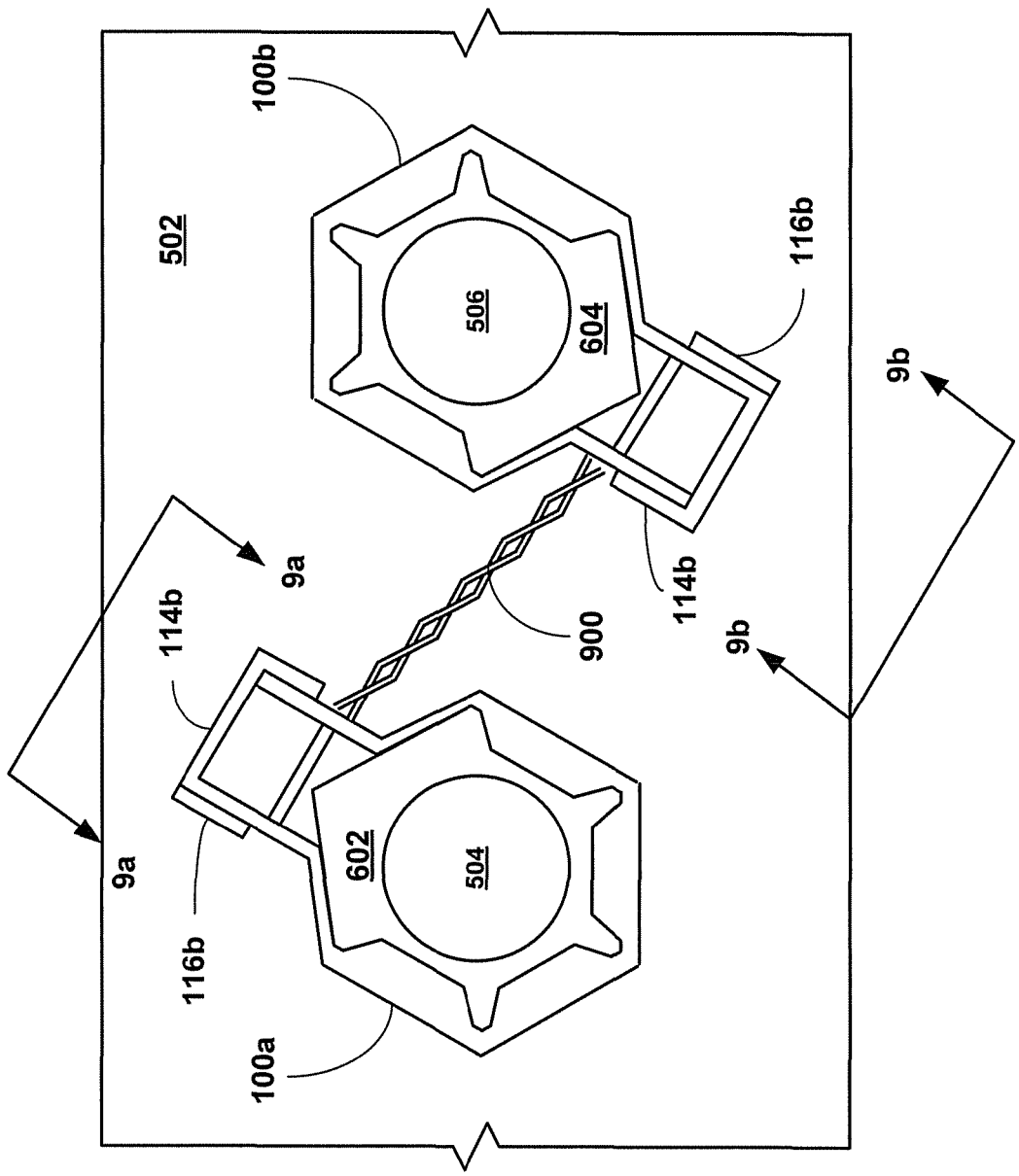
FIG. 9 is a top view of the nut retainers of FIGS. 8, 8a, 8b, and 8c after mounting safety wire between the nut retainers.
Figure 9A:
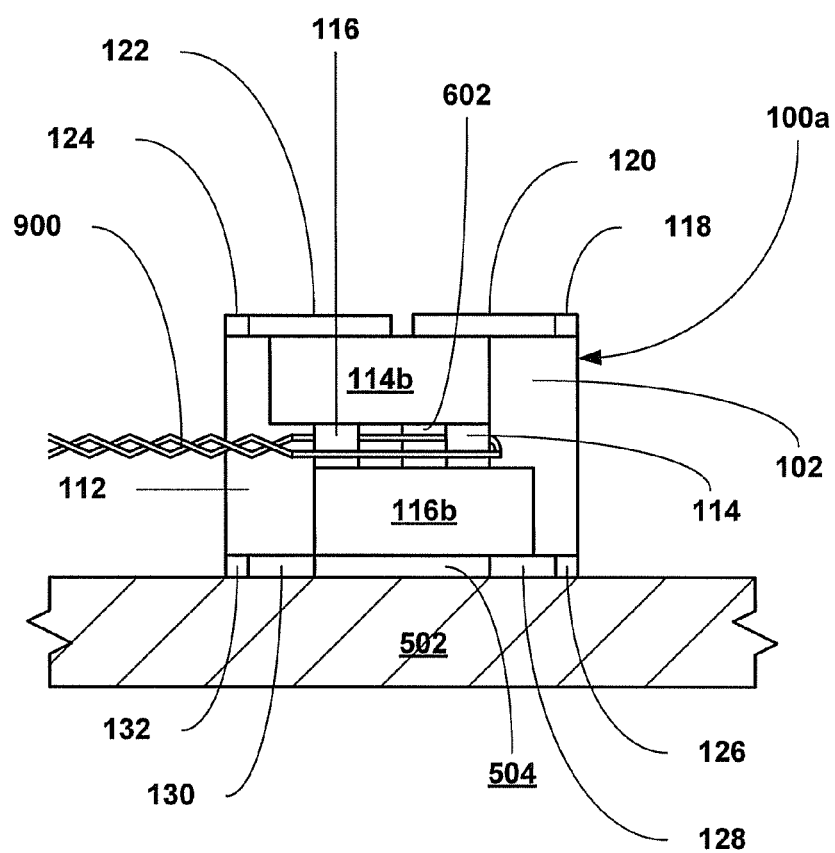
FIG. 9a is a side view of one of the nut retainers of FIG. 9.
Figure 9B:
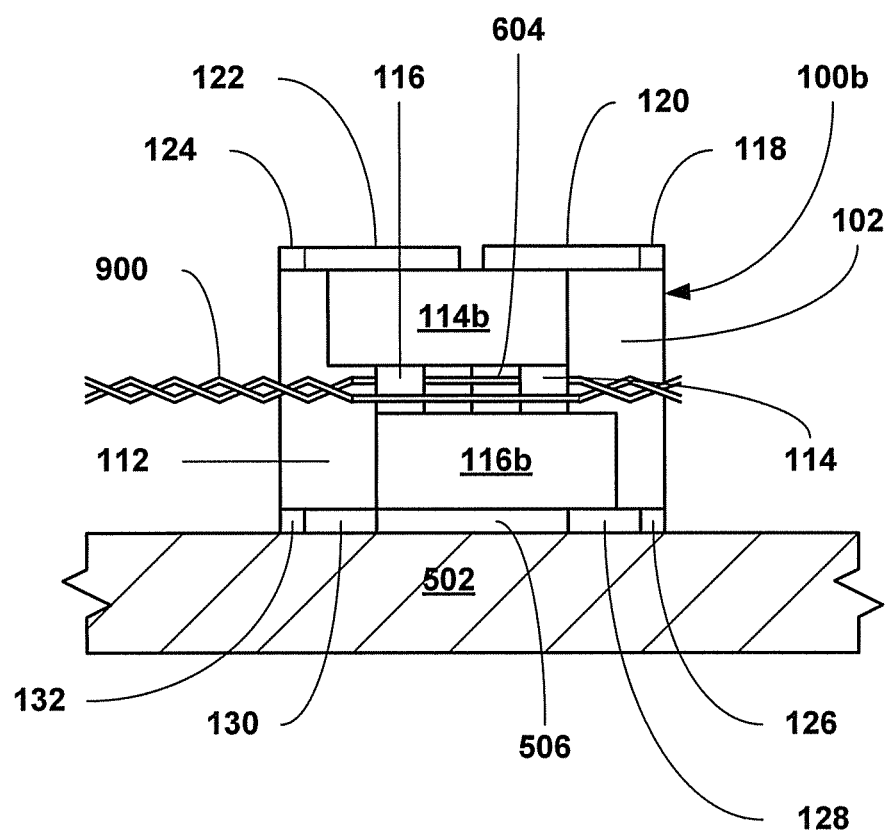
FIG. 9b is a side view of another one of the nut retainers of FIG. 9.
Figure 10:
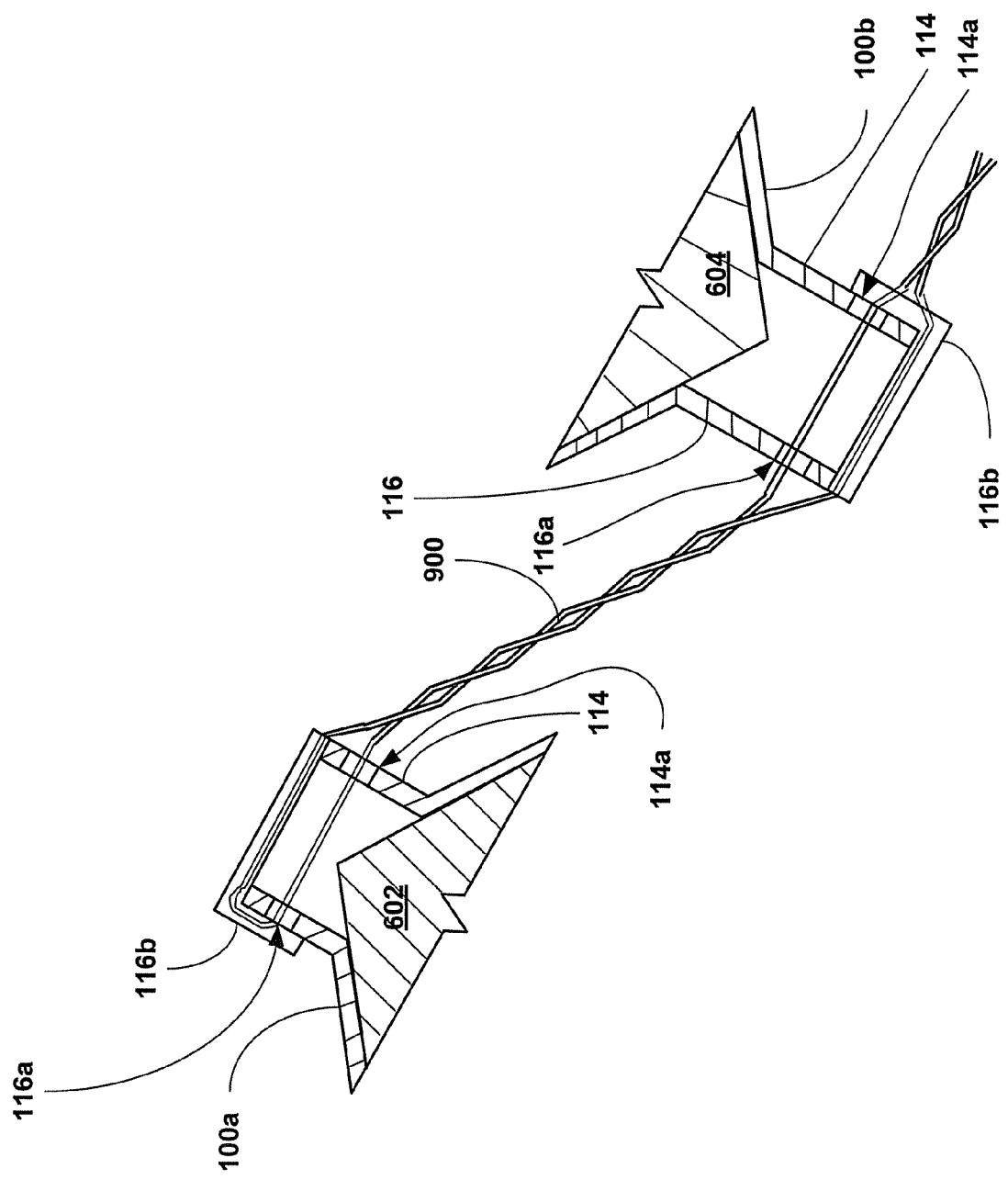
FIG. 10 is a fragmentary cross-sectional view of the nut retainers of FIG. 9 taken about a mid line through the safety wire mounting holes of the nut retainers.

Referring now to FIGS. 7, 7*a*, and 7*b*, nut retainers, 100*a* and 100*b*, are then placed onto the nuts, 602 and 604, respectively, with the retainers oriented at opposite directions. In an exemplary embodiment, each of the nut retainers, 100*a* and 100*b*, are identical to the nut retainer 100 described above with reference to FIGS. 1 to 4*a*. In an exemplary embodiment, after placing the nut retainers, 100*a* and 100*b*, on the nuts, 602 and 604, the nuts are retained within the vertical side members, 102, 104, 106, 108, 110, 112, and horizontal retainers, 118, 120, 122, 124, 126, 128, 130 and 132.

Referring now to FIGS. 8, 8*a*, 8*b*, and 8*c*, the tabs, 114*b* and 116*b*, of the nut retainers, 100*a* and 100*b*, are bent over and around the ends and back walls of the vertical side members, 116 and 114, respectively. As a result, the vertical side members, 114 and 116, of the nut retainers, 100*a* and 100*b*, are locked together.

Referring now to FIGS. 9, 9*a*, 9*b*, and 10, an end of a safety wire 900 is then threaded through the passages, 114*a* and 116*a*, of the vertical side members, 114 and 116, respectively, of the nut retainer 110*a*. The other end of the safety wire 900 is then looped around the end of the vertical wall 114 of the nut retainer 100*a* and then bent into the recess formed in the end of the nut retainer between the bent over tabs, 114*b* and 116*b*. The free ends of the safety wire 900 are then twisted about one another until the twisted portion is proximate the nut retainer 100*b*. One of the free ends of the safety wire is then threaded through the passages, 116*a* and 114*a*, of the vertical side members, 116 and 114, respectively, and the other free ends of the safety wire is run through the recess formed in the end of the nut retainer between the bent over tabs, 114*b* and 116*b*. The free ends of the safety wire 900 are then twisted about one another. As a result, a tensile force may be exerted between the ends of the nut retainers, 100*a* and 110*b*, that may tend to further tighten the nuts, 602 and 604, on the threaded posts, 504 and 506.

During operation, the nut retainers, 100*a* and 100*b*, in combination with the safety wire 900, may prevent the nuts, 602 and 604, from unthreading from the threaded posts, 504 and 506.

Figure 11A:
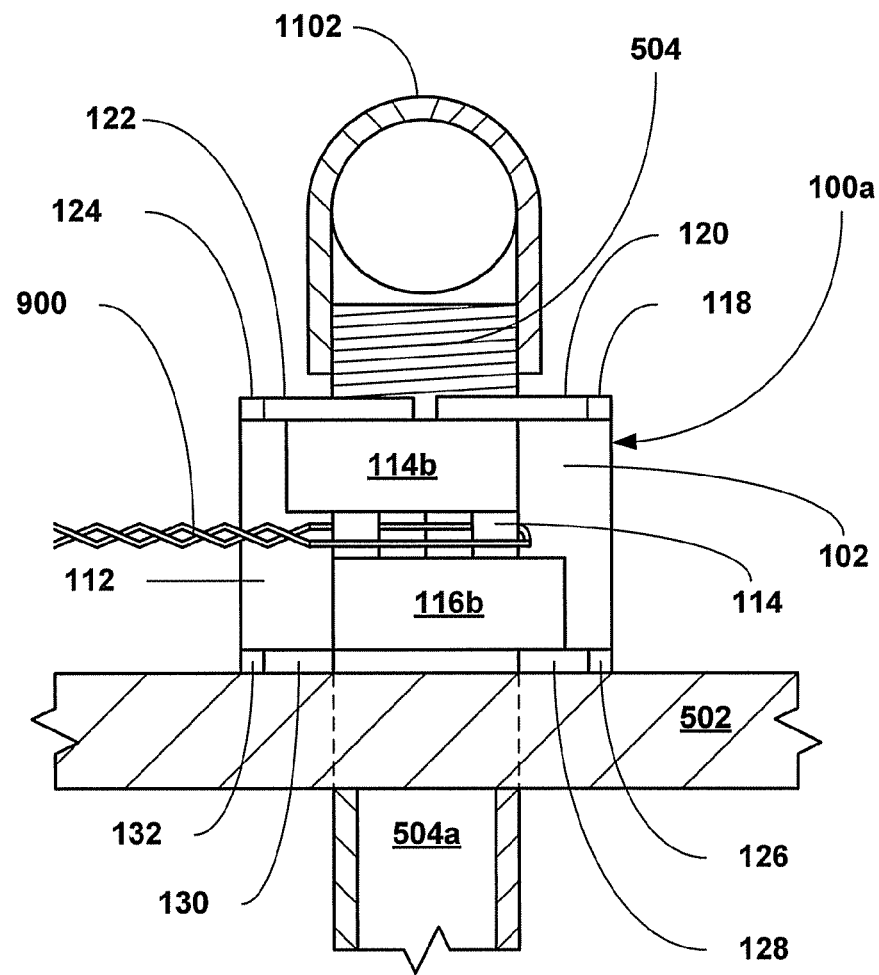
FIGS. 11a and 11b are fragmentary cross-sectional illustrations of the connection of conduits to the threaded posts of the FIGS. 9, 9a, 9b, and 10.
Figure 11B:
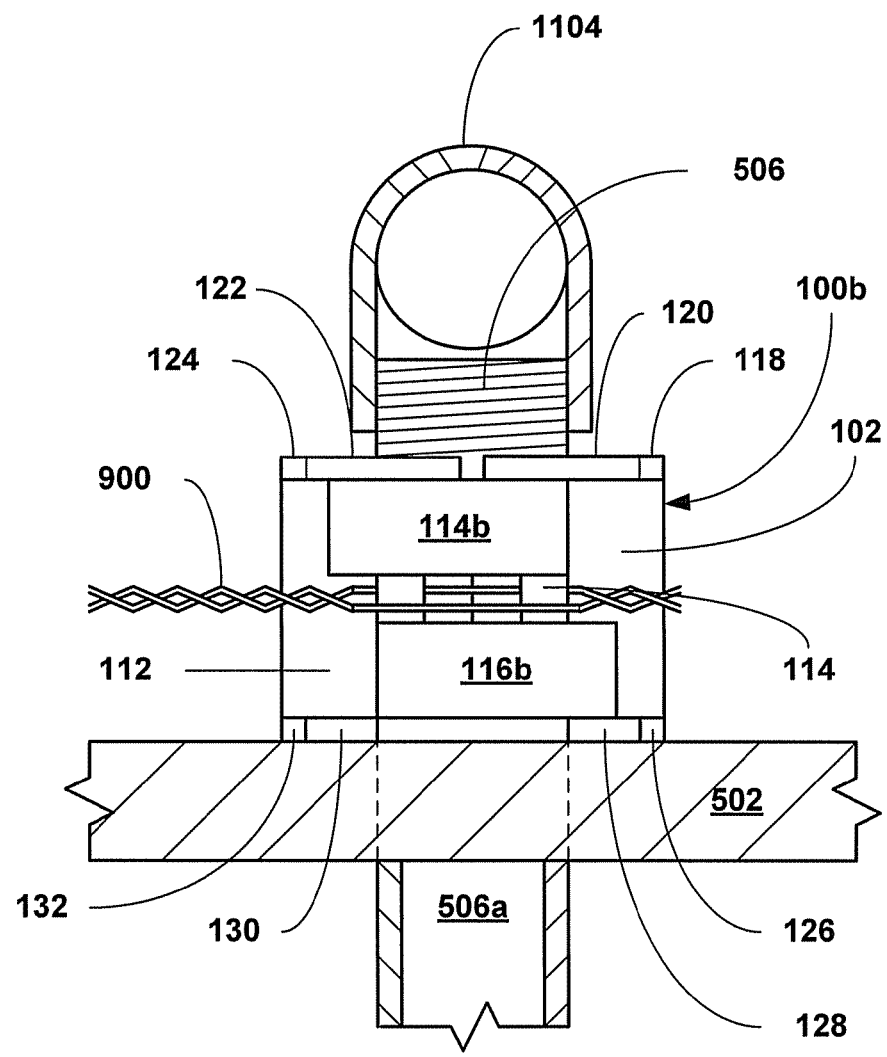

In an exemplary embodiment, as illustrated in FIGS. 11*a* and 11*b*, the teachings of the present disclosure may be applied to the threaded fastening of tubular members to the support structure 502. For example, hydraulic and/or pneumatic control lines, 1102 and 1104, that convey hydraulic and/or pneumatic control fluids may be coupled to the support structure using the threaded posts, 504 and 506, and the nuts, 602 and 604. In such applications, the threaded posts, 504 and 506, may define passageways, 504*a* and 506*a*, for conveying the hydraulic and/or pneumatic control fluids between the threaded posts and hydraulic and/or pneumatic conduits.

It is understood that variations may be made in the above without departing from the scope of the invention. For example, the nut retainers 100 of the present disclosure may be modified to fit onto any geometry such as, for example, square, elliptical, triangular, etc . . . In addition, the safety wire 900 may be restrained by any adjacent structure and therefore does not need to be restrained only by another nut retainer 100. Further, the nut retainer 100 does not have to have the tabs, 114*b* and 116*b*, bent over the opposing vertical members, 116 and 114, of the nut retainer 100 in order to employ the safety wire 900 to restrain the nut retainer. In addition, the tabs, 114*b* and 116*b*, may be omitted from the nut retainer 100. Further, the teachings of the present exemplary embodiments may be employed in the restraining of any type of fastener that can be captured by a suitable shaped retainer. In addition, spatial references are for the purpose of illustration only and do not limit the specific orientation or location of the structure described above. While specific embodiments have been shown and described, modifications can be made by one skilled in the art without departing from the spirit or teaching of this invention. The embodiments as described are exemplary only and are not limiting. Many variations and modifications are possible and are within the scope of the invention. Accordingly, the scope of protection is not limited to the embodiments described, but is only limited by the claims that follow, the scope of which shall include all equivalents of the subject matter of the claims.

The invention claimed is:

1. A retainer for a fastener having polygonal side surfaces, comprising:
   a plurality of side walls joining each other at angles that define a polygonal receptacle to mate with and receive the side surfaces of the fastener, the receptacle having a receptacle axis adapted to coincide with a fastener axis;
   the receptacle having a gap in the side walls and being resilient so as to allow the gap to widen and the receptacle to be placed around the fastener;
   right side and left side gate walls joining the side walls at the gap and extending laterally outward from the receptacle axis parallel with each other; and
   a right side tab joining an outer edge of the right side gate wall and a left side tab joining an outer edge of the left side gate wall, each of the tabs extending laterally from the side walls away from the receptacle axis on opposite edges of the gap, the tabs being bendable relative to the gate walls from an open position to a locked position in locking engagement with one another to prevent the gap from widening after installation on the fastener.

2. The retainer of claim 1, further comprising:
   at least one first flange coupled to a first end of the receptacle and extending a partial distance inward from one of the side walls toward and perpendicular to the receptacle axis to mate with and receive a first end surface of the fastener, and
   at least one second flange coupled to a second end of the receptacle and extending a partial distance inward from one of the side walls toward and perpendicular to the receptacle axis to mate with and receive a second end surface of the fastener.

3. The retainer of claim 2, wherein:
said at least one first flange comprises a plurality of the first flanges spaced around the receptacle; and
said at least one second flange comprises a plurality of the second flanges spaced around the receptacle.

4. The retainer of claim 1, wherein:
in the closed position, the right side one of the tabs extends across the gap, then laterally toward the receptacle axis alongside the left side gate wall; and
in the closed position, the left side one of the tabs extends across the gap, then laterally toward the receptacle axis alongside the right side gate wall.

5. The retainer of claim 4, wherein each of the tabs has an axial dimension less than the side walls of the receptacle, such that in the closed position, one of the tabs closes part of the gap and the other closes another part of the gap.

6. The retainer of claim 1, further comprising:
a passageway extending through at least one of the side gate walls; and
a safety wire extending through the passageway for securing to an adjacent structure.

7. A retainer for a nut, comprising:
a metal strip bent into a configuration of a polygonal receptacle with a plurality of vertical side walls adapted to mate with and receive vertical surfaces of the nut;
the receptacle having a receptacle axis and a gap in the vertical side walls, the receptacle being flexible so as to allow the gap to widen to enable the receptacle to be placed around the nut;
right hand and left hand gate walls joining the vertical side walls at the gap and extending laterally outward away from the receptacle axis; and
a right hand tab joining an outer edge of the right hand gate wall and being bendable from an open position to a closed position extending across the gap and back toward the receptacle axis alongside the left hand gate wall to prevent the gap from widening after the retainer has been installed around the nut.

8. The retainer of claim 7, further comprising:
a passageway extending through one of the gate walls; and
a safety wire extending through the passageway for securing to an adjacent structure.

9. The retainer of claim 7, wherein the gate walls are parallel to each other and spaced apart by a width of the gap.

10. A retainer for a nut, comprising:
a plurality of vertical walls joining each other at angles to define a polygonal-shaped receptacle to mate with and receive vertical surfaces of the nut, the receptacle having a central axis; the vertical walls of the receptacle having a gap therein and being flexible so as to allow the gap to widen to allow the receptacle to be placed around the nut;
two tabs extending laterally from the receptacle on opposite edges of the gap, the tabs being bendable into locking engagement with each other to prevent widening of the gap after the receptacle is installed on the nut;
an upper flange formed on an upper edge of the one of the vertical side walls and extending horizontally a partial distance toward the axis to mate with and receive a top surface of the nut; and
a lower flange formed on a lower edge of one of the vertical walls and extending horizontally a partial distance toward the axis to mate with a receive a lower surface of the nut.

11. The retainer of claim 10, wherein there are six vertical walls spaced around the axis.

12. The retainer of claim 11, wherein:
a first one of the tabs extends vertically downward from the upper edge of the receptacle;
a second one of the tabs extends vertically upward from the lower edge of the receptacle; and
a lower edge of the first one of the tabs is above an upper edge of the second one of the tabs when the tabs are bent into locking engagement with each other.

13. The retainer of claim 11, wherein at least one of the tabs has a passageway therethrough and the retainer further comprises a safety wire extending through the passageway for connection to an adjacent structure.

14. The retainer according to claim 11 wherein:
two of the vertical walls at the gap of the receptacle extend away from the axis and are parallel to each other; and
each of the tabs joins one of the two vertical walls at the gap.

* * * * *